United States Patent Office 3,519,663
Patented July 7, 1970

3,519,663
COMPLEX COMPOUNDS AND METHODS
OF MAKING SAME
Stephen O'Brien, George Albert Gamlen, and David
Thomas Thompson, Runcorn, England, assignors to
Imperial Chemical Industries Limited, London, England, a corporation of Great Britain
No Drawing. Filed Aug. 15, 1966, Ser. No. 572,221
Claims priority, application Great Britain, Aug. 13, 1965, 34,740/65
Int. Cl. C07j 15/00, 11/00; C07c 5/02
U.S. Cl. 260—429   12 Claims

ABSTRACT OF THE DISCLOSURE

Dinuclear bridged transition metal complexes in which the transition metals are different and are selected from Groups VI–A, VII–A, VIII and I–B of the Periodic Table and in which the bridging ligands are univalent and do not incorporate chelating ligands.

This invention relates to dinuclear bridged transition metal complexes, a process for their preparation and to their use as catalysts.

Dinuclear bridged transition metal complexes are known in which the two transition metals are the same. We have found that certain compounds of this general kind can be made in which the transition metal atoms are different.

Accordingly the present invention provides dinuclear bridged transition metal complexes in which the transition metal atoms are different and are selected from Groups VI–A, VII–A, VIII and I–B of the Periodic Table of the Elements, and in which the bridging ligands are univalent and do not incorporate chelating ligands.

The Periodic Table of the Elements referred to is that given in "Advanced Inorganic Chemistry" by Cotton and Wilkinson published by Interscience (1962).

By "chelating ligand" we mean a bi-dentate ligand which is attached at two sites to the same metal atom. The bridging ligands may be bi-dentate but, if so, must be attached to one site of each metal atom.

For ease of understanding, examples of the compounds of the present invention may be regarded as containing a group represented by the following formula:

(I)

where L¹, L² are univalent non-chelating bridging ligands which may be the same or different and M′, M² are transition metals as defined above; but the present invention does not depend on the structural accuracy of this representation nor of any of the other formulae given herein. Complexes according to our invention may contain one or more bridging ligands and may contain metal-metal bonds in addition to the aforesaid bridging ligand or ligands.

Examples of transition metals are platinum, palladium, tungsten, chromium, molybdenum and iron. Examples of ligands L′, and L² are chloride, bromide, sulphide, thiocyanate, phosphido or groups containing selenium, arsenic or antimony.

In addition to the group represented by Formula I above the compounds of the present invention will contain other ligands as required to satisfy the co-ordination numbers and valencies of the transition metal atoms present. These ligands may include neutral and monovalent ligands and may be the same or different to the extent permitted by the co-ordination requirements of the transition metal atoms.

Many of the compounds of the present invention may be obtained in cis or trans forms depending upon the method of preparation and both these and other isomeric variations are to be included within the scope of the present invention.

According to a further aspect of the invention we provide a process for the preparation of the compounds provided by the present invention which comprises reacting a compound or complex of one transition metal with a compound or complex of a second transition metal with or without additional ligand-forming reactants, the transition metals being selected from Groups VI–A, VII–A, VIII and I–B of the Periodic Table.

For example, a complex of one transition metal containing halide and substituted phosphine ligands may be reacted with a halogen-containing compound of the second transition metal. Alternatively, the carbonyls of two different transition metals may be reacted with an organic phosphine to form a phosphido bridged dinuclear carbonyl. The organic phosphine may be a monophosphine, such as diphenyl phosphine, or a diphosphine, such as tetramethyldiphosphine.

The dinuclear bridged transition metal complex produced by the aforementioned process may be reacted with further reagents to bring about ligand exchange. For example, $\mu,\mu'$-dihaloplatinum paladium complexes may be treated with diphenylphosphine, so that the halogen bridges are replaced with diphenylphosphido bridges. Also, non-bridging ligands may be replaced by such means.

Reaction conditions will vary according to the nature of the starting materials, reagents and product, but in many cases it is convenient to perform the reaction in an inert solvent. An inert atmosphere and elevated temperatures and pressures may also be used.

The compounds of the present invention are useful as catalysts in a variety of organic reactions, for example hydrogenation, carbonylation and oxidation.

It is to be understood however, that not all compounds are suitable as catalysts in all types of organic reaction: suitability should be determined by a small-scale trial in each case. The compounds containing platinum and palladium are particularly useful as catalysts for carbonylation reactions, and also for hydrogenation of unsaturated organic compounds, for example alkynes, alkenes and mixtures of same. The hydrogenation reactions are preferably carried out at elevated pressure and temperature.

The invention is illustrated by, but not limited to the following examples, in which all parts are by weight, unless otherwise stated.

EXAMPLE 1

Dichlorobis(tri-n-butylphosphine)-$\mu,\mu'$-dichloroplatinum palladium [(nBu₃P)₂Cl₄PtPd] was prepared as follows. Trans-bis (tri-n-butylphosphine) dichloroplatinum (1 part) was dissolved in ethyl alcohol 40 parts and added to sodium chloropalladite (0.56 part) also dissolved in ethyl alcohol (40 parts). The solution was refluxed under nitrogen for 1 hour. The resulting mixture was filtered, concentrated, water added and then extracted with benzene. The product (1.1 parts) obtained from the benzene layer was recrystallised from petroleum ether (B.P. 60–80° C.) containing a small amount of benzene M.P. 145–147° C.

Analysis.—Calculated for $C_{24}H_{54}Cl_4P_2PtPd$ (percent): C, 34.0; H, 6.37; Cl, 16.75. Found (percent): C, 34.36; 33.97; H, 6.52; 6.59; Cl, 16.55. Consistent with the formula:

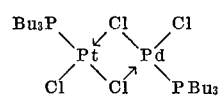

The product was believed to be the trans isomer from dipole measurements.

EXAMPLE 2

The same product as in Example 1 was obtained when cis- or trans-bis (tri-n-butylphosphine-dichloroplatinum (1 part) was mixed with palladium chloride (0.27 part) and the resulting dry mixture heated at 170–180° C., under an atmosphere of nitrogen, for two hours. The product was isolated by extracting with benzene and isolating as above.

EXAMPLE 3

The procedure of Example 1 was repeated using trans-bis (tri-n-butylphosphine)dibromoplatinum and sodium bromopalladite.

The product analysis was consistent with the formula

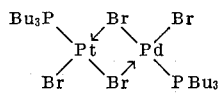

The recrystallised product had a melting point of 144–146° C.

EXAMPLE 4

Dichlorobis(tri-n-butylphosphine) - $\mu,\mu'$ - bis(diphenylphosphido) platinum palladium was prepared as follows. Dichlorobis(tri-n-butylphosphine - $\mu,\mu'$ - dichloroplatinum palladium (1.0 part), prepared as in Example 1, was dissolved in ethanol (40 parts) under nitrogen. Diphenylphosphine (0.50 part) was added to the solution and the resulting mixture stirred at room temperature for 1 hour. After this time sodium ethoxide (prepared from 0.058 part of sodium) was added when a colour change from pale orange to dark red occurred. Nearly all the ethanol was evaporated off under reduced pressure and then water and benzene were added. The benzene layer was separated, dried with magnesium sulphate, concentrated to small bulk and passed down an alumina column made up in the same solvent. On eluting with benzene, a yellow band was collected from which the product (0.34 part) was isolated by removal of the solvent and recrystallisation from petroleum ether (B.P. 60–80° C.) containing a small amount of methylene dichloride.

*Analysis.*—Calculated for $C_{48}H_{74}P_4Cl_2PdPt$ (percent): C, 50.25; H, 6.46; P, 10.81; Cl, 6.19. Found (percent): C, 50.93; H, 6.67; P, 11.20; Cl, 6.55.

This is consistent with the formula:

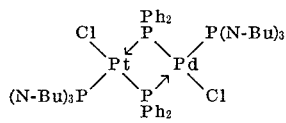

EXAMPLE 5

Dichlorobis(tri-n-propylphosphine) - $\mu,\mu'$ - dichloroplatinum palladium [$(nPr_3P)_2Cl_4PtPd$] was prepared as follows. Bis(tri - n - propylphosphine)dichloropalladium (0.50 part) was dissolved in ethyl alcohol (32 parts) and added to sodium chloroplatinite (0.43 part) dissolved in distilled water (10 parts). The resulting solution was refluxed under nitrogen for one hour, and was then filtered through kieselguhr. The filtrate was concentrated, water added and the mixture extracted with chloroform. The product (0.51 part) obtained from the organic layer was recrystallised from ethyl alcohol M.P. 184–188° C.

*Analysis.*—Calculated for $C_{18}H_{42}Cl_4P_2PtPd$ (percent): C, 28.30; H, 5.50; Cl, 18.58; P, 8.12. Found (percent): C, 28.62; H, 5.72; Cl, 18.79; P, 8.6. Consistent with the formula:

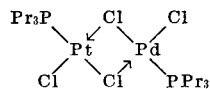

The product was believed to be the trans isomer from dipole measurements.

EXAMPLE 6

Chromium hexacarbonyl (1.85 parts), molybdenum hexacarbonyl (2.15 parts), tetramethyldiphosphine (1.02 parts) and benzene (6.2 parts) were heated in a sealed tube at 260° C. for 46 hours under nitrogen. The solvent was removed under reduced pressure and the residue purified by chromatography on alumina. Elution with 20% benzene in petroleum ether, evaporation of the eluate from the orange band, and recrystallisation of the residue (benzene/petroleum ether) afforded the product (1.54 parts, 37% yield) as orange cubes, identified by elemental analysis and infra-red and nuclear magnetic resonance spectra, as $\mu,\mu'$-bis(dimethylphosphido) (tetracarbonylchromium) (tetracarbonylmolybdenum) of formula:

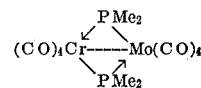

EXAMPLE 7

Diphenylchlorophosphine chromium pentacarbonyl (0.5 part) and diphenylphosphine iron tetracarbonyl (0.4 part) were refluxed in tetrahydrofuran (22 parts) for 60 minutes to give a brownish-red solution. The solvent was removed under reduced pressure and the residue extracted with hexane. The resulting solution was characterised spectrographically. The ultra-violet/visible spectrum exhibited $\lambda_{max}$ at 223 m$\mu$ and inflections at 330 and 348 m$\mu$. The solid product recovered from the solution was unstable, but the spectrum of the solution was most consistent with the following structure:

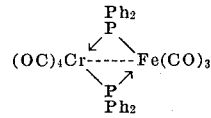

EXAMPLE 8

Diphenylchlorophosphine molybdenum pentacarbonyl (0.25 part) and diphenylphosphine iron tetracarbonyl (0.2 part) were refluxed in tetrahydrofuran (22 parts) for 60 minutes to give a dark yellow-orange solution. The solvent was removed under reduced pressure and the residue extracted with hexane. The resulting solution was characterised spectrographically. The ultra-violet visible spectrum exhibited inflections at 223, 300 and 335 m$\mu$ and the infra-red spectrum showed carbonyl absorptions at 1960, 1985, 2000, 2058 and 2080 cm.$^{-1}$. The solid product recovered from the solution was unstable, but the spectra of the solution are most consistent with the following structure

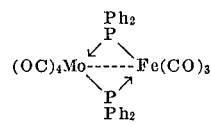

EXAMPLE 9

Diphenylchlorophosphine tungsten pentacarbonyl ($W(CO)_5PPh_2Cl$; 0.5 part) and diphenylphosphine iron tetracarbonyl ($Fe(CO)_4PPh_2H$; 0.3 part) were refluxed in tetrahydrofuran (22 parts) for 70 minutes to give a deep brownish-yellow solution. The solvent was removed under reduced pressure and the residue extracted with hexane. The resulting solution was characterised spectrographically. The ultra-violet/visible spectrum exhibited $\lambda_{max}$ at 222 m$\mu$ and inflections at 300 and 335 m$\mu$. The solid product recovered from the solution was unstable, but the spectrum of the solution was consistent with the following structure:

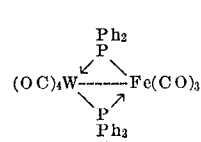

EXAMPLE 10

Dichlorobis(tri-n-butylphoshine) - $\mu,\mu'$ - dichloroplatinum palladium (0.42 part) was dissolved in benzene (175 parts) 1 part (by volume) of this solution was added to 50 parts (by volume) of benzene containing 10% by weight of each of n-hexyne-1 and n-octene-1. The mixture was transferred to an autoclave vessel which was pressured up to 80 atmospheres with hydrogen and heated up to 175° C., when a pressure of 100 atmospheres was obtained. After 1 hour without agitation under these conditions, the vessel was cooled, vented and the reaction products were analysed by gas chromatography.

Each result is the duplicate of two tests. Product analysis (percent by weight).

| | |
|---|---|
| n-Hexane | 1.8 |
| n-Hexene-1 | 7.2 |
| n-Hexyne-1 (unreacted, by difference) | 1.0 |
| Total n-$C_6$ | 10.0 |
| n-Octane | 0.9 |
| n-octene-1 (unreacted, by difference) | 9.1 |
| Total $C_8$ | 10.0 |
| Benzene | 80.0 |

EXAMPLE 11

The procedure of Example 10 was repeated, using 0.15 part of dibromobis(tri-n-butylphosphine)-$\mu,\mu'$-dibromoplatinum palladium. Product analysis (percent by weight).

| | |
|---|---|
| n-Hexane | 1.6 |
| n-Hexene-1 | 5.8 |
| n-Hexyne-1 (unreacted, by difference) | 2.6 |
| Total n-$C_6$ | 10.0 |
| n-Octane | 0.8 |
| n-Octene-1 (unreacted, by difference) | 9.2 |
| Total n-$C_8$ | 10.0 |
| Benzene | 80.0 |

EXAMPLE 12

The procedure of Example 10 was repeated using 0.38 part of dichlorobis(tri-n-propylphoshine)-$\mu,\mu'$-dichlorolatinum palladium. Product analysis (percent by weight).

| | |
|---|---|
| n-Hexane | 1.7 |
| n-Hexene-1 | 8.2 |
| n-Hexyne-1 (unreacted, by difference) | 0.1 |
| Total n-$C_6$ | 10.0 |
| n-Octane | 0.8 |
| n-Octene-1 (unreacted, by difference) | 9.2 |
| Total n-$C_8$ | 10.0 |
| Benzene | 80.0 |

EXAMPLE 13

The procedure of Example 10 was repeated using 0.46 part of dichlorobis(tri - n - butylphosphine)-$\mu,\mu'$ - bis(diphenylphosphido) platinum alladium. Product analysis (percent by weight).

| | |
|---|---|
| n-Hexane | 1.7 |
| n-Hexene-1 | 6.4 |
| n-Hexyne-1 (unreacted, by difference) | 1.9 |
| Total n-$C_6$ | 10.0 |
| n-Octane | 1.0 |
| n-Octene-1 (unreacted, by difference) | 9.0 |
| Total n-$C_8$ | 10.0 |
| Benzene | 80.0 |

We claim:

1. Dihalo - bis(trihydrocarbylphosphine) - $\mu,\mu'$-dihaloplatinum palladium wherein the halo groups are selected from the group consisting of chloro and bromo ligands and the trihydrocarbylphosphine is selected from the group consisting of tri-n-propyl and tri-n-butyl phosphine ligands.

2. Dihalobis(trihydrocarbylphosphine) - $\mu$-$\mu'$-bis(dihydrocarbylphosphine) platinum palladium wherein the halo group is selected from the group consisting of chloro and bromo ligands and the trihydrocarbylphosphine is selected from the group consisting of tri-n-propyl and tri-n-butyl phosphine ligands and the dihydrocarbylphosphine is selected from the group consisting of diphenylphosphine and dimethylphosphine ligands.

3. $\mu,\mu'$ - Bis(dihydrocarbylhosphine) (tetracarbonylchromium) (tetracarbonylmolybdenum) wherein the dihydrocarbylphosphine is selected from the group consisting of diphenylphosphine and dimethylphoshine ligands.

4. A product of the reaction of a dihydrocarbylhalophosphine-pentacarbonyl of a Group VI metal with a dihydrocarbylphosphine iron tetracarbonyl wherein the halo is selected from the group consisting of chloro and and bromo ligands and the dihydrocarbylphosphine is selected from the group consisting of diphenylphosphine and dimethylphoshine ligands.

5. Dichlorobis(tri - n - butylphosphine)-$\mu,\mu'$-dichloroplatinum palladium.

6. dibromobis(tri - n - butylphosphine)-$\mu,\mu'$-dibromoplatinum palladium.

7. Dichlorobis(tri-n-butylphosphine)-$\mu,\mu'$-bis(diphenylphosphide) platinum palladium.

8. Dichlorobis(tri - n - propylphosphine)-$\mu,\mu'$-dichloroplatinum palladium.

9. $\mu,\mu'$-Bis(dimethylphosphido) (tetracarbonylchromium) (tetracarbonylmolybdenum).

10. The product of reacting diphenylchlorophosphine chromium pentacarbonyl with diphenylphoshine iron tetracarbonyl.

11. The product of reacting diphenylchlorophosphine molybdenum pentacarbonyl with diphenylphoshine iron tetracarbonyl.

12. The product of reacting diphenylchlorophosphine tungsten pentacarbonyl with diphenylphosphine into tetracarbonyl.

References Cited

Mellor: A comprehensive treatise on Inorganic and Theoretical Chemistry, 1936, Longmans, Green and Co., London; vol. 12, page 336, vol. 15, pages 422 and 766, vol. 16, pages 285 and 331.

Tilney-Bassett: J. Chem. Soc., 1963, pp. 4784-8.

Joshi et al.: Z. Natwforschg., 17b (1962), p. 565.

HELEN M. McCARTHY, Primary Examiner

A. P. DEMERS, Assistant Examiner

U.S. Cl. X.R.

252—431; 260—438.5, 439, 683.9, 690